Figure 1:
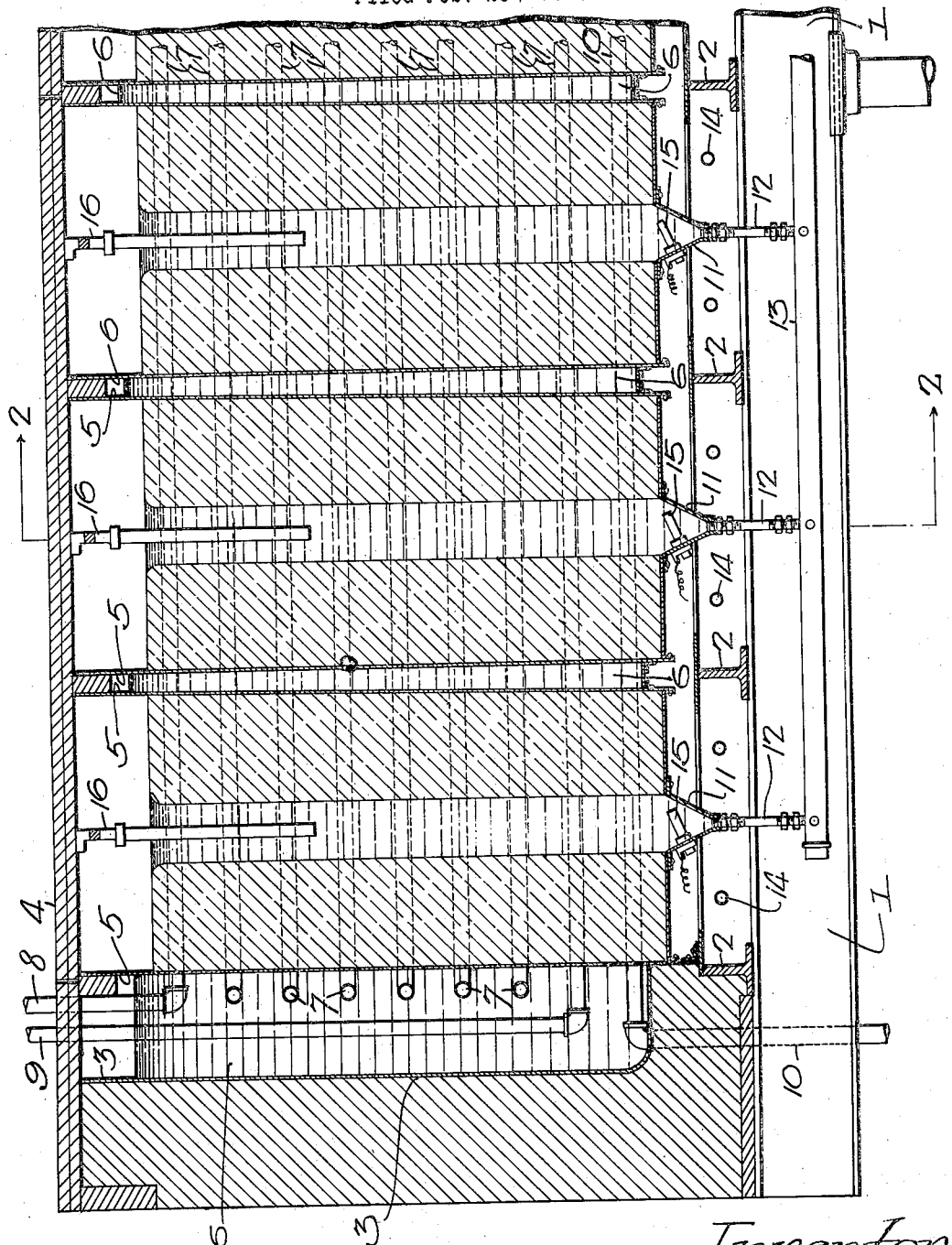

Feb. 5, 1924.

J. F. WINKLER.

ICE MAKING APPARATUS

Filed Feb. 23, 1922

1,483,032

2 Sheets-Sheet 1

Inventor—
Joseph F. Winkler.
by his Attorneys—
Howson & Howson

Feb. 5, 1924.
J. F. WINKLER
ICE MAKING APPARATUS
Filed Feb. 23, 1922
1,483,032
2 Sheets-Sheet 2
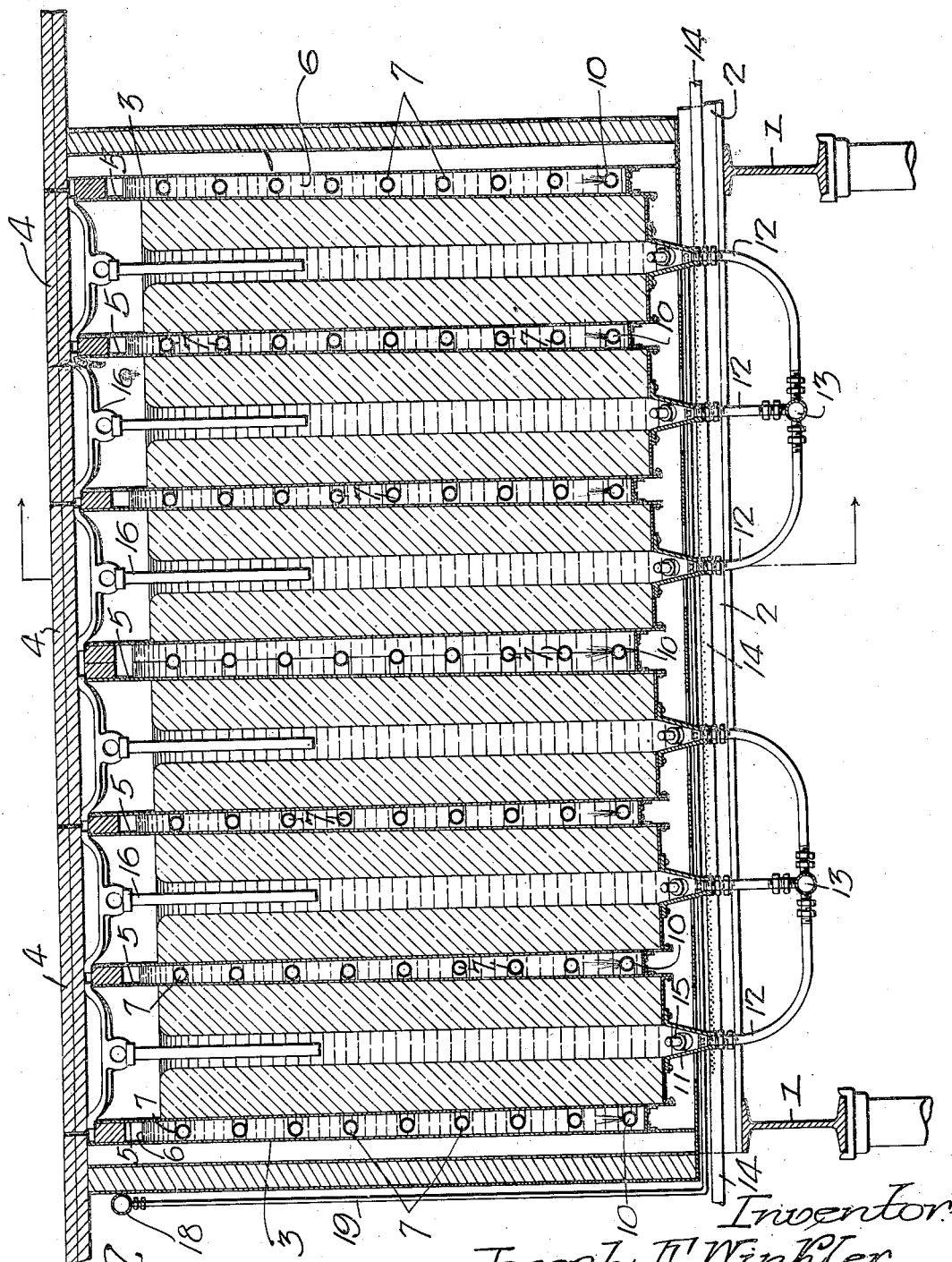

Patented Feb. 5, 1924.

1,483,032

UNITED STATES PATENT OFFICE.

JOSEPH F. WINKLER, OF PHILADELPHIA, PENNSYLVANIA.

ICE-MAKING APPARATUS.

Application filed February 23, 1922. Serial No. 538,677.

*To all whom it may concern:*

Be it known that I, JOSEPH F. WINKLER, a citizen of the United States, residing in Philadelphia, Pennsylvania, have invented the Ice-Making Apparatus, of which the following is a specification.

One object of this invention is to provide a refrigerating system having a novel combination and arrangement of cans relatively to the tank in which they are mounted, particularly designed to facilitate the melting loose of the ice from the walls of said cans when said ice is to be removed therefrom; the invention particularly contemplating the provision of means for delivering heated fluid, preferably in the form of a hot spray, to the bottoms of the cans in order to attain the above object.

I further desire to provide novel means for utilizing an electric current in preventing the trapping of minute air bubbles in the ice as it is being frozen in the cans, with a view to producing clear blocks of ice.

Another object of my invention is to provide a novel method of utilizing the heat-transferring liquid and the refrigerating agent in the can-containing tank of a refrigerating system, with a view to first freezing water in the cans of the system and thereafter melting loose the ice from the walls of said cans when it is desired to remove it.

I also desire to provide a system of the above noted type with novel means for insuring circulation of the heat-transferring liquid with a view to reducing the time required to freeze the water in the cans and thus materially increase the efficiency of the apparatus.

These objects and other advantageous ends I attain as hereinafter set forth, reference being had to the accompanying drawings, in which, Fig. 1 is a fragmentary vertical section of a brine tank and its associated apparatus constructed and assembled for operation in accordance with my invention; and Fig. 2 is a transverse vertical section on the line 2—2, Fig. 1.

In the above drawings, 1—1 represents a foundation or supporting structure in the form of relatively heavy girders, on which are mounted transverse beams 2—2 carrying a suitably heat insulated metallic tank 3. This has a removable cover 4 preferably of heat insulating material, and has permanently mounted within it a series of vertically elongated cans 5 of substantially rectangular section characterized, in accordance with my invention, by having their lower ends project downwardly beyond the bottom of the tank for a certain distance such as three or four inches. The joints between the tank and the cans are of course liquid tight and may have any suitable detail construction without departing from my invention.

The space within the tank surrounding the cans is filled with a heat-transferring liquid 6, such as brine, calcium chloride, or the like, and immersed in this liquid is a series of horizontal or other suitable arranged pipe coils 7, connected through conduits 8 and 9 with a source of refrigerant material such as ammonia, ethyl chloride, or the like. Also encircling the cans 5 and preferably mounted within the bottom or lowest portion of the tank 3 is a pipe 10 having a series of nozzles or openings within said tank and connected to a source of supply of air under pressure.

Each of the cans has connected to the center of its bottom an inlet 11 connected through a pipe 12 with a water supply conduit 13. Extending underneath the bottoms of the tanks are steam or hot air pipes 14 having suitably placed openings whereby sprays or jets of steam or hot air may be directed against the adjacent bottom of the cans when this is desirable. Each of the bottom inlet portions of the cans has mounted in it an electrode 15 insulated from the can and supporting structure and designed to be connected with a suitable source whereby under conditions of operation an electric current may be caused to flow into the water within the cans and from the same to the cans and tank structure and thence back to the source. Such a current would preferably be delivered at an electro-motive force of from three to four volts and I have found that if the positive terminal of current force be connected to said electrodes 15, the minute current flowing is sufficient to prevent the trapping of small air bubbles in the ice as it is being formed in the cans, with the result that said ice is clear instead of translucent.

Suitable lifting devices 16 are supported on the upper edges of the cans and extend centrally down within the same so that the ice formed freezes to these devices and when melted loose from the walls of the cans, can be lifted out of the latter thereby.

Under conditions of operation the refrigerant material, such as ammonia, is expanded in the coils 7, thereby reducing the temperature of the brine 6 to such a point as to cause the water in the cans to freeze. During this freezing action, air is delivered to the brine through the pipe 10 at a slow rate and the rising of the bubbles through said brine causes forced circulation thereof, which tends to hasten its cooling action. At the same time electric current is supplied to the electrodes so that minute air bubbles are prevented from being trapped in the ice as it is formed, and when all of the water in the cans has been solidified, I may melt the ice loose from the walls of said cans for which purpose I deliver hot refrigerant material to the pipe 7 so that the temperature of the brine is quickly raised and causes the walls of the cans to be so heated as to free the blocks of ice which they contain. At the same time, sprays of steam or hot air are directed from the pipes 14 against the bottoms of the cans, so that these also are caused to be freed from the ice blocks within them, after which the cover 4 may be removed and by the lifting devices 1$^b$ the freed blocks of ice may be taken out of the cans. A fresh charge of water may now be introduced from the conduit 13 through the pipes 12 and cold or expanding refrigerating material again delivered to the conduit 8 and coil 7 so as to cool the brine 6 in the tank 5.

By the above apparatus and method of operation, I am enabled not only to reduce the time of freezing blocks of ice of a given size, but the ice produced is clearer and is manufactured more efficiently than has hitherto been considered possible. Moreover the ice may be freed from the can walls and removed in a minimum time by reason of the devices above described, so that the system as a whole may be utilized to the utmost advantage.

If desired, in addition to the steam pipes 14, I may also provide an air supply pipe 18 connected by suitable branches 19 so placed as to deliver hot air to the downwardly projecting bottoms of the ice cans, it being thus possible to deliver heated air to the bottoms of said cans either with the steam delivered from the pipes 14 or independently thereof.

I claim:

1. The combination in a refrigerating system of a tank; cans therein adapted to receive a liquid to be frozen; heat transferring medium in the tank around the cans; and means for establishing an electrical current in said liquid.

2. The combination in a refrigerating system of a tank; heat transferring liquid in the tank; a water container surrounded by said liquid; and electrical means for delivering an electric current to the water in said container during freezing for preventing trapping of air bubbles.

3. The combination in a refrigerating system of a tank; heat transferring liquid in the tank; a water container surrounded by said liquid; and electrical means for preventing trapping of air bubbles in the water in said container as it is being frozen, said means including an electrode mounted adjacent the center of the bottom of the container.

4. In a refrigerating system, the combination with a tank having a heat transferring liquid therein; of a container positioned in said tank, said container being adapted to receive a liquid to be frozen; and a charged electrode positioned in the container.

JOSEPH F. WINKLER.